United States Patent
Kang

(10) Patent No.: US 11,422,892 B2
(45) Date of Patent: Aug. 23, 2022

(54) DATA STORAGE APPARATUS AND OPERATING METHOD THEREOF

(71) Applicant: SK hynix Inc., Icheon-si (KR)

(72) Inventor: Hye Mi Kang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/149,314

(22) Filed: Jan. 14, 2021

(65) Prior Publication Data

US 2022/0043710 A1    Feb. 10, 2022

(30) Foreign Application Priority Data

Aug. 7, 2020  (KR) ......................... 10-2020-0099250

(51) Int. Cl.
*G06F 11/10*    (2006.01)
*G06F 12/109*   (2016.01)

(52) U.S. Cl.
CPC ........ *G06F 11/1076* (2013.01); *G06F 12/109* (2013.01); *G06F 2212/657* (2013.01)

(58) Field of Classification Search
CPC ............... G06F 11/1076; G06F 12/109; G06F 2212/657
See application file for complete search history.

(56) References Cited

U.S. PATENT DOCUMENTS

| | | | | |
|---|---|---|---|---|
| 11,216,339 B2* | 1/2022 | Seo | ...................... | G11C 11/4093 |
| 2016/0132265 A1* | 5/2016 | Yi | .......................... | G06F 3/0614 |
| | | | | 711/105 |
| 2018/0060194 A1* | 3/2018 | Ryu | ........................ | G06F 11/10 |
| 2019/0130991 A1* | 5/2019 | Son | ...................... | G06F 11/2215 |
| 2019/0250985 A1* | 8/2019 | Seo | ...................... | G06F 11/1068 |
| 2020/0097361 A1* | 3/2020 | Suh | ......................... | G11C 7/06 |
| 2020/0142771 A1* | 5/2020 | Cho | ...................... | G06F 11/1048 |
| 2020/0151055 A1* | 5/2020 | Eom | ................... | G06F 13/4282 |
| 2020/0192754 A1* | 6/2020 | Cho | ................... | H03M 13/3707 |
| 2020/0265137 A1* | 8/2020 | Yoon | ................... | G06F 11/1048 |
| 2021/0064462 A1* | 3/2021 | Eun | ...................... | G06F 11/1048 |
| 2021/0081278 A1* | 3/2021 | Seo | .......................... | G11C 29/74 |
| 2021/0208967 A1* | 7/2021 | Cha | ...................... | G06F 11/1044 |

FOREIGN PATENT DOCUMENTS

| | | | |
|---|---|---|---|
| KR | 1020120107495 A | 10/2012 |
| KR | 1020170000914 A | 1/2017 |
| KR | 1020190087217 A | 7/2019 |

* cited by examiner

*Primary Examiner* — Kyle Vallecillo
(74) *Attorney, Agent, or Firm* — Perkins Coie LLP

(57) ABSTRACT

A data storage apparatus is provided to include a storage including a main data region for storing first data and a spare region for storing second data indicating attributes of the first data; and a controller in communication with a host and configured to control the storage based on a request from the host, wherein the controller comprises: a first error check and correction (ECC) engine configured to perform an error correction on the first data stored in the main data region of the storage; and a second ECC engine configured to perform an error correction on the second data stored in the spare region of the storage.

21 Claims, 11 Drawing Sheets

FIG. 4A

| MS_ID | Logical Address | Physical Address |
|---|---|---|
| 0 | LBA0 | PBA0 |
|  | LBA1 | PBA1 |
|  | ⋮ | ⋮ |
|  | LBA99 | PBA99 |
| ⋮ | ⋮ | ⋮ |
| 99 | LBA9900 | PBA9900 |
|  | LBA9901 | PBA9901 |
|  | ⋮ | ⋮ |
|  | LBA9999 | PBA9999 |

<Map Table>

FIG. 4B

| MS_ID | ADDR | F1 | F2 |
|---|---|---|---|
| 0 | XXXX | 1 | 0 |
| 1 | XXXX | 0 | 0 |
| ⋮ | ⋮ | ⋮ | ⋮ |
| 99 | XXXX | 1 | 1 |

<Index Table>

DATA STORAGE APPARATUS AND OPERATING METHOD THEREOF

CROSS-REFERENCES TO RELATED APPLICATION

This patent document claims priority under 35 U.S.C. § 119(a) to Korean application number 10-2020-0099250, filed on Aug. 7, 2020, in the Korean Intellectual Property Office, which is incorporated herein by reference in its entirety.

TECHNICAL FIELD

The technology and implementations disclosed in this patent document generally relate to a semiconductor integrated apparatus, including a data storage apparatus, an operation method thereof.

BACKGROUND

A data storage apparatus is connected to a host to receive a request from the host and performs a data input/output operation on a storage medium based on the request from the host. The data storage apparatus may operate under the control of a controller that relays communications between the host and the storage medium.

The data storage apparatus may be implemented by various storage media, which may include, for example, a nonvolatile memory apparatus such as a flash memory apparatus.

To access the storage medium for the data storage apparatus who received the request from the host, map data is needed, which indicates a mapping between a logical address used by the host and a physical address used by the data storage apparatus. The map data may be stored in the storage medium, and may be at least partially loaded into a working memory used by the controller during the operation of the data storage apparatus.

SUMMARY

In an embodiment, a data storage apparatus is provided to include: a storage including a main data region for storing first data and a spare region for storing second data indicating attributes of the first data; and a controller in communication with a host and configured to control the storage based on a request from the host. The controller comprises: a first error check and correction (ECC) engine configured to perform an error correction on the first data stored in the main data region of the storage; and a second ECC engine configured to perform an error correction on the second data stored in the spare region of the storage.

In an embodiment, a data storage apparatus is provided to include: a storage including a main data region and a spare region; and a controller in communication with the storage and configured to control the storage, wherein the controller is in communication with a host and comprises: a map data manager configured to receive, from the host, a write request including write data to be written in the storage and a logical address corresponding to a location in the storage to which the data is written, generate a map segment including mapping information between a physical address and the logical address, and generate spare data based on attributes of the write data; a first ECC engine configured to perform an error correction on main data including the write data or the map segment; a second ECC engine configured to perform an error correction on the spare data; and a processing circuit configured to write the main data to the main data region, and to write the spare data to the spare region.

In an embodiment, an operation method of a data storage apparatus including a storage including a main data region where first data is stored and a spare region where second data based on attributes of the first data is stored and a controller configured to control the storage in response to a request of a host is provided. The operating method comprising: a step in which the controller writes and reads the first data by a first ECC engine and writes and reads the second data by a second ECC engine.

In an embodiment, an operation method of a data storage apparatus is provided. The method comprises: receiving a request, from a host, to read or write data from a storage in the data storage apparatus; and performing an operation to read or write data from the data storage apparatus including a main data region provided for storing first data and a spare region provided for storing second data that is generated based on attributes of the first data, wherein the performing of the operation includes writing or reading the first data using a first ECC engine and writing or reading the second data using a second ECC engine.

BRIEF DESCRIPTION OF THE DRAWINGS

FIG. 4a and FIG. 4b are configuration diagrams of a map segment table and an index table based on an embodiment of the disclosed technology.

DETAILED DESCRIPTION

As the capacity of the storage medium increases, a large size of memory is required to allow map data corresponding to the capacity of the storage medium to reside in the controller. A method for partially loading the map data has been introduced. However, when map data of data requested to be read by the host is not resident in the memory, or when the proportion of a random read workload is large, a process of loading the map data from the storage medium is repeated and the repetition of loading the map data may deteriorate the operation performance. The disclosed technology can be implemented to provide a data storage apparatus that processes a read operation or a write operation In a way that reduces the above deterioration.

Figure 1:
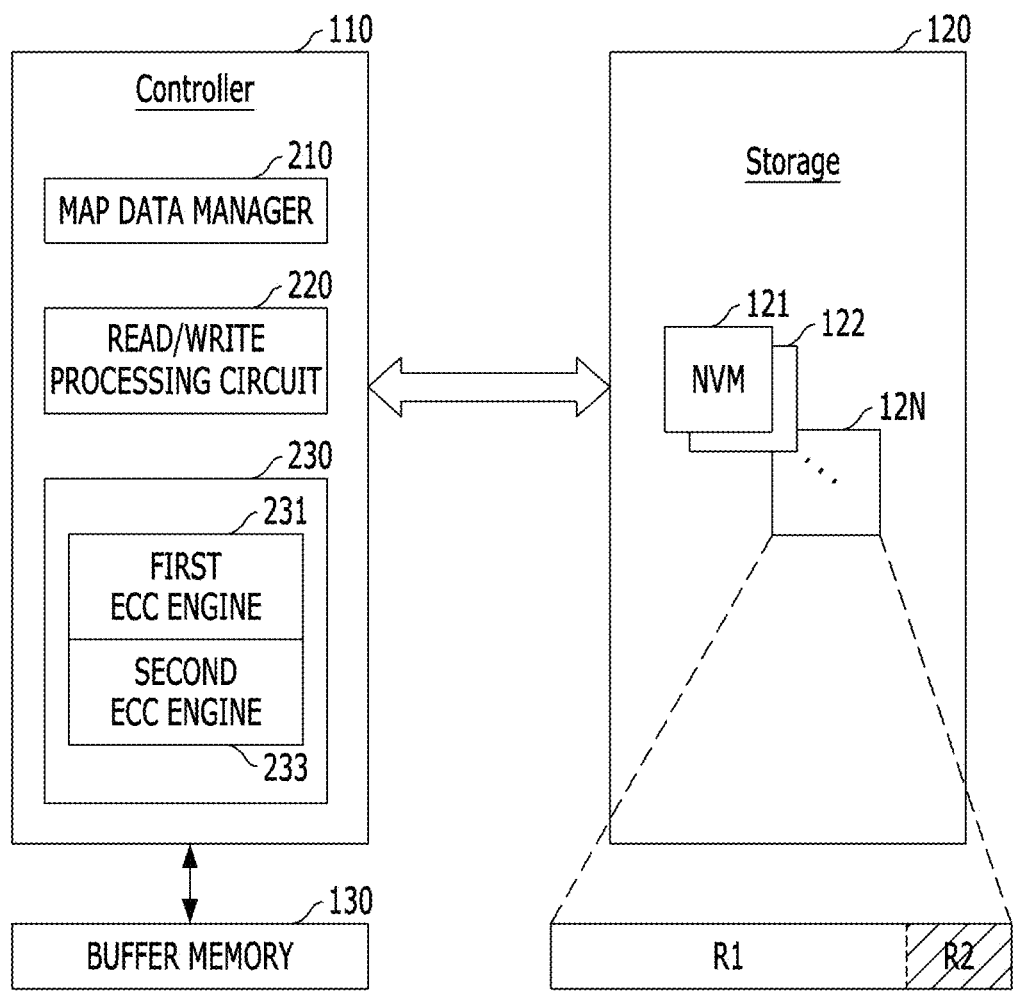
FIG. 1 is a configuration diagram of a data storage apparatus based on an embodiment of the disclosed technology.

FIG. 1 is a configuration diagram of a data storage apparatus 10 based on an embodiment of the disclosed technology.

Referring to FIG. 1, the data storage apparatus 10 in accordance with an embodiment may include a controller 110, a storage 120, and a buffer memory 130.

The controller 110 may control the storage 120 in response to a request from a host. For example, the controller 110 may allow data to be programmed to the storage 120 based on a write request from the host. For example, the controller 110 may provide the data written in the storage 120 to the host based on a read request of the host.

The storage 120 may be used to write data therein or output the data stored therein based on the control of the controller 110. The storage 120 may include a volatile or nonvolatile memory apparatus. In an embodiment, the storage 120 may be implemented using a memory element that includes various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), or a spin torque transfer magnetic RAM (STT-MRAM). The storage 120 may include a plurality of dies, a plurality of chips, or a plurality of packages. In addition, the storage 120 may operate as a single-level cell that stores one-bit data in one memory cell or a multi-level cell that stores multi-bit data in one memory cell.

In an embodiment, the storage 120 may include a plurality of nonvolatile memory apparatuses (NVMs) 121 to 12N. Each of the nonvolatile memory apparatuses (NVMs) 121 to 12N may include a main data region R1 and a spare region R2. The main data region R1 and the spare region R2 may constitute one page. The spare region R2 is used to store attribute information on data that is programmed to the main data region R1.

The buffer memory 130 serves as a space capable of temporarily storing data when the data storage apparatus 10 performs a series of operations, such as writing or reading data, in cooperation with the host. The buffer memory 130 may be provided outside and/or inside of the controller 110.

In an embodiment, the controller 110 may include a map data manager 210, a read/write processing circuit 220, and an error check and correction (ECC) engine 230.

The map data manager 210 may manage mapping information between addresses (physical addresses) of a physical storage space of the storage 120 and logical addresses assigned to the storage 120 by the host. In an embodiment, the map data manager 210 may configure a map table and an index table, which are shown in FIGS. 4a and 4b. While more detailed explanations will be discussed later based on FIGS. 4a and 4b, the map table includes map segments, each segment including a number of entries. Each entry indicates mapping information between one logical address and one physical address. The number of entries included in each segment can be preset and a set of the map segments may be managed as the map table. The location of each map segment in the map table may be managed as an index table.

The index table and the map table may be stored in the storage 120. When the data storage apparatus 10 is booted, the index table may be loaded into a working memory of the controller 110 and referred to.

The read/write processing circuit 220 may control the ECC engine 230 in response to the read/write request of the host, and transmit a read/write command to the storage 120 based on the map segment generated by the map data manager 210.

The ECC engine 230 may encode data to be written to the storage 120 or decode data read from the storage 120, under the control of the read/write processing circuit 220. In an embodiment, the ECC engine 230 may include a first ECC engine 231 and a second ECC engine 233.

Meta data including the map segment may be generated in response to the write request from the host. A main data including host data requested to be written or the meta data may be stored in the main data region R1, and a spare data generated based on the attribute of the main data may be stored in the spare region R2. Host data refers to data that is requested from the host to be written or read. In such a case, the controller 110 may control the main data to be encoded by the first ECC engine 231 and the spare data to be encoded by the second ECC engine 233. During the read operation, the data of the main data region R1 is decoded by the first ECC engine 231 and the spare data is decoded by the second ECC engine 233.

In some cases, data requested to be written by the host may have a specific pattern associated with an address of a physical area to be written. The map data manager 210 may generate spare data when the data requested to be written satisfies predefined attributes.

In an embodiment, when physical addresses of the data requested to be written are continuous, the map data manager 210 may set a first flag for a first map segment for the data requested to be written, store the first flag in the index table, and generate a base physical address, which is a head value of the physical address in the first map segment, as spare data.

In an embodiment, when the data requested to be written has a certain pattern, that is, when the data has substantially the same logical value or a specific logical pattern is repeated, the map data manager 210 may set a second flag for a second map segment for the data requested to be written, store the second flag in the index table, and generate the repeated pattern and the number of repetitions as the spare data.

Accordingly, in order to read data programmed to a continuous physical space or data having a specific pattern, it will be understood that it is advantageous for a high speed operation to configure a map segment to be used in a read operation based on a base physical address and a map segment size or to omit a data read process of a same pattern on the basis of the repeated pattern, rather than reading and decoding all map data corresponding to the data and configuring the map segment.

At least one of the first flag and the second flag may be selectively adopted, and spare data based on the attributes of main data may be stored using any one or both of the flags.

In an embodiment, the first ECC engine 231 may be an engine using a low density parity check (LDPC) code and the second ECC engine 233 may be an engine using a Bose Chaudhuri Hocquenghem (BCH) code. Those operations are examples only and the disclosed technology is not limited thereto. Thus, the first ECC engine 231 and the second ECC engine 233 can be configured to operate other operations as well as long as the second ECC engine 233 processes data for an operation with a lower level of a complexity and a smaller amount of computations as compared to the first ECC engine 231.

Figure 2:
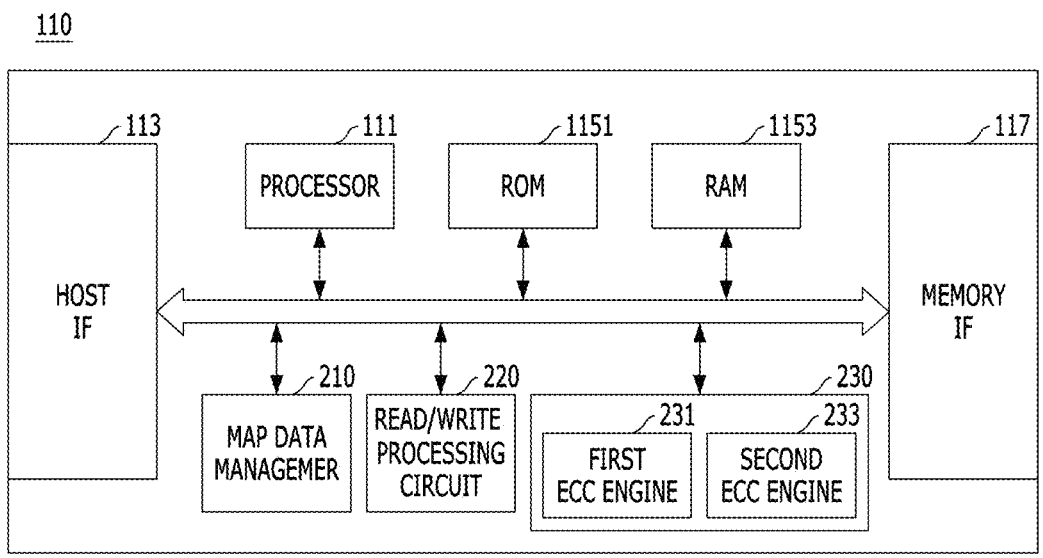
FIG. 2 is a configuration diagram of a controller based on an embodiment of the disclosed technology.

FIG. 2 is a configuration diagram of the controller 110 in accordance with an embodiment.

Referring to FIG. 2, the controller 110 in accordance with an embodiment may include a processor 111, a host interface (IF) 113, a ROM 1151, a RAM 1153, a memory interface (IF) 117, the map data manager 210, the read/write processing circuit 220, and the ECC engine 230.

The processor 111 may be configured to transfer various control information required for a data read or write operation for the storage 120 to the host IF 113, the RAM 1153, the memory IF 117, the map data manager 210, the read/write processing circuit 220, and the second engine 230. In an embodiment, the processor 111 may operate according to firmware provided for various operations of the data storage apparatus 10. In an embodiment, the processor 111 may be configured in a form, in which hardware and software executed by the hardware are combined, so as to be able to perform a function of a flash translation layer (FTL) including various functions for managing the storage 120 in cooperation with other components, for example, garbage collection, address mapping, wear leveling, or others.

The host IF 113 may provide a communication channel that is a physical connection for receiving a command and a clock signal from the host and controlling data input/output between the host and the data storage apparatus 10, under the control of the processor 111. Furthermore, the host IF 113 may provide an interface interfacing with the data storage apparatus 10 in correspondence to a bus format of the host. The bus format of the host may include at least one of standard interface protocols such as a secure digital, a universal serial bus (USB), a multi-media card (MMC), an embedded MMC (eMMC), a personal computer memory card international association (PCMCIA), a parallel advanced technology attachment (PATA), a serial advanced technology attachment (SATA), a small computer system interface (SCSI), a serial attached SCSI (SAS), a peripheral component interconnection (PCI), a PCI express (PCI-E), or a universal flash storage (UFS).

The ROM 1151 may store program codes required for the operation of the controller 110, for example, firmware or software, and store code data and the like used by the program codes.

The RAM 1153 may store data required for the operation of the controller 110 or data generated by the controller 110.

The memory IF 117 may provide a communication channel for signal transmission/reception between the controller 110 and the storage 120. The memory IF 117 may write data, which has been temporarily stored in the buffer memory 130, to the storage 120 under the control of the processor 111. Furthermore, the memory IF 117 may transfer data read from the storage 120 to the buffer memory 130 so that the read data is temporarily stored.

The map data manager 210 may manage, as a map segment, the mapping information between the addresses (physical addresses) of the physical storage space of the storage 120 and the logical addresses assigned to the storage 120 by the host. In an embodiment, the map data manager 210 may configure map segments in response to the write request from the host and manage the map segments to be included in the map table. Thus, the map data manager 210 may configure the map table including map segments. The location of each map segment in the map table may be included in the index table that is configured by the memory controller 110.

In an embodiment, when the physical addresses of host data requested to be written are continuous, the map data manager 210 may set a first flag F1 for the first map segment for the data requested to be written, add the first flag F1 to the index table, and generate a base physical address as the spare data. The base physical address corresponds to the head value of the physical address in the first map segment, whose physical address is the smallest among physical addresses included in the first map segment. The map table and the index table are to be explained in more detail with reference to FIGS. 4a and 4b later in this specification.

In an embodiment, when the host data requested to be written has a certain pattern, for example, when the host data has substantially the same logical value or a specific logical pattern is repeated, the map data manager 210 may set a second flag F2 for the second map segment for the data requested to be written, add the second flag F2 to the index table, and generate the repeated pattern and the number of repetitions as the spare data.

The index table may be configured to include one or both of the first flag F1 and the second flag F2 to indicate the attributes of the host data requested to be written.

The read/write processing circuit 220 may control the ECC engine 230 in response to the read/write request of the host and transmit a read or program command to the storage 120.

The ECC engine 230 may include the first ECC engine 231 that encodes and decodes the main data, and the second ECC engine 233 encodes and decodes the spare data. The second ECC engine 233 processes data for an operation with a lower level of a complexity and a smaller amount of computations as compared to the first ECC engine 231 and encodes and decodes the spare data. In an embodiment, the first ECC engine 231 may be an engine using a low density parity check (LDPC) code and the second ECC engine 233 may be an engine using a Bose Chaudhuri Hocquenghem (BCH) code. However, those operations are examples only and the disclosed technology is not limited thereto.

During a write operation in accordance with an embodiment, the read/write processing circuit 220 may control the separate ECC engines 231 and 233 to encode the main data and the spare data generated based on of the attributes of the main data, respectively, and transmit a program command to program the main data and the spare data. In an embodiment, the read/write processing circuit 220 may control the first ECC engine 231 to encode the main data including the map segment or the host data, control the second ECC engine 233 to encode the spare data, and transmit a program command for the encoded main data and spare data to the storage 120.

During a read operation, the read/write processing circuit 220 may check whether a map segment corresponding to data to be read has been cached in a working memory such as the buffer memory 130 or the RAM 1153.

When the map segment has not been cached, the read/write processing circuit 220 may check whether a flag has been set in a map segment of read-requested data with reference to the index table. Based on a checking result that the flag has been set, the read/write processing circuit 220 may read the spare data from the spare region R2 and control the second ECC engine 233 to decode the read spare data. When the flag set in the index table is the first flag F1, the base physical address may be read from the spare region R2.

The map data manager 210 may configure a map segment of data to be read based on the base physical address derived as the decoding result of the second ECC engine 233. In an embodiment, the map data manager 210 may sequentially increase the base physical address according to a set offset, and configure and load a map segment including a designated number of data. In another embodiment, the map data manager 210 may not load all of map data constituting a map segment, and may configure a map segment based on the base physical address and the size of data to be read. In such a case, the map data manager 210 may minimize the size of the map segment.

The read/write processing circuit 220 may access the storage 120 based on the configured map segment and read the host data. The read host data may be decoded and outputted by the first ECC engine 231.

When the flag set in the index table is the second flag F2, the repeated pattern and the number of repetitions may be read from the spare region R2 and decoded by the second ECC engine 233. The read/write processing circuit 220 may configure and output host data based on the decoded repeated pattern and number of repetitions.

When no flag has been set, the read/write processing circuit 220 may read a map segment from the main data region R1 based on the address of the map segment stored in the index table, and control the first ECC engine 231 to decode the read map segment. As the map data manager 210 configures the map segment by, for example, loading the map segment into the working memory, the read/write processing circuit 220 may access a region of the storage 120 indicated by the configured map segment, and read the host data. The read host data may be decoded and outputted by the first ECC engine 231.

During the read operation, when the map segment has been cached, the read/write processing circuit 220 may read the host data from the storage 120 based on the cached map segment, control the first ECC engine 231 to encode the read host data and output the encoded host data.

Figure 3:
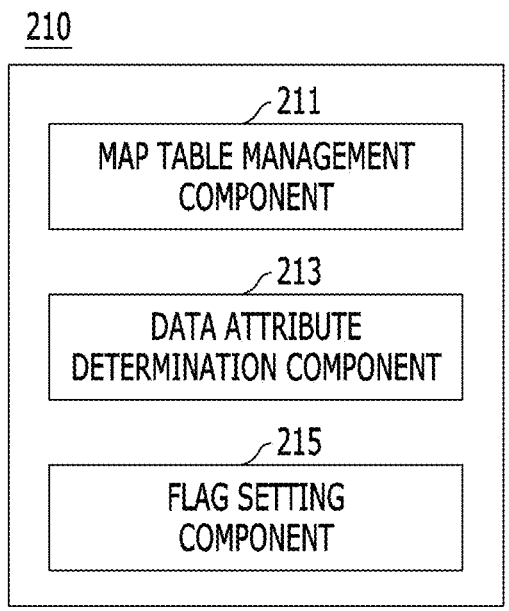
FIG. 3 is a configuration diagram of a map data manager based on an embodiment of the disclosed technology.

FIG. 3 is a configuration diagram of the map data manager 210 in accordance with an embodiment.

Referring to FIG. 3, the map data manager 210 may include a map table management component 211, a data attribute determination component 213, and a flag setting component 215.

The map table management component 211 may configure map segments by grouping unit entries, which are mapping information between a logical address and a physical address of host data requested to be written, into a preset unit, and manage a set of the map segments as the map table. In addition, the map table management component 211 may manage map segment storage locations and flags as the index table for each map segment identifier ID in the map table.

The map table management component 211 may configure a map segment for host data requested to be read. In an embodiment, the map table management component 211 may configure the map segment according to whether a flag for the map segment of the host data requested to be read has been set. When the first flag has been set in the map segment, the map table management component 211 may configure and load the map segment based on the base physical address stored in the spare region R2. When the first flag has not been set, the map table management component 211 may load all map segments read from the storage 120.

The data attribute determination component 213 may check whether data requested to be written satisfies predefined attributes. In an embodiment, the data attribute determination component 213 may check whether physical addresses of the data requested to be written are continuous or the data requested to be written has a specific pattern, and generate spare data when the data requested to be written satisfies the predefined attributes.

In an embodiment, when the physical addresses of the data requested to be written are continuous, the data attribute determination component 213 may generate the base physical address, which is the head value of the physical address in the map segment, as the spare data. In an embodiment, when the data requested to be written has a certain pattern, that is, when the data has substantially the same logical value or a specific logical pattern is repeated, the data attribute determination component 213 may generate the repeated pattern and the number of repetitions of the data requested to be written as the spare data.

The flag setting component 215 may store the first flag F1 and/or the second flag F2 in the index table based on the check result of the data attribute determination component 213. In an embodiment, when the physical addresses of the data requested to be written are continuous, the flag setting component 215 may store the first flag F1 in the index table, and when the data requested to be written has a certain pattern, the flag setting component 215 may store the second flag F2 in the index table.

FIG. 4a and FIG. 4b are configuration diagrams of a map table and an index table based on an embodiment of the disclosed technology.

Referring to FIG. 4a, the map table may include a plurality of map segments MS_ID0 to MS_ID99. Each of the map segments MS_ID0 to MS_ID99 may include a plurality of physical addresses PBAx respectively corresponding to a plurality of logical addresses LBAx (x is a natural number between 0 and 9999). Mapping information between one logical address LBAx and one physical address PBAx is an entry ETR, and each of the map segments MS_ID0 to MS_ID99 may include m entries (m is 100).

Referring to FIG. 4b, the index table may include addresses ADDR of the storage 120 where the map segments MS_ID0 to MS_ID99 are stored, and the first flag F1 and the second flag F2 are set based on whether the data requested to be written to a corresponding map segment satisfies predefined attributes.

In an embodiment, the first flag F1 may be related to the continuity of physical addresses included in each of the map segments MS_ID0 to MS_ID99, and the second flag F2 may be related to a repeated pattern of data corresponding to each entry ETR. Accordingly, the first flag F1 may be set for each of the map segments MS_ID0 to MS_ID99, and the second flag F2 may be set for each of the entries ETR.

The index table and the map table illustrated in FIG. 4a and FIG. 4b may be stored in the storage 120. When the data storage apparatus 10 is booted, the index table may be loaded into the working memory of the controller 110 and referred to.

Figure 5:
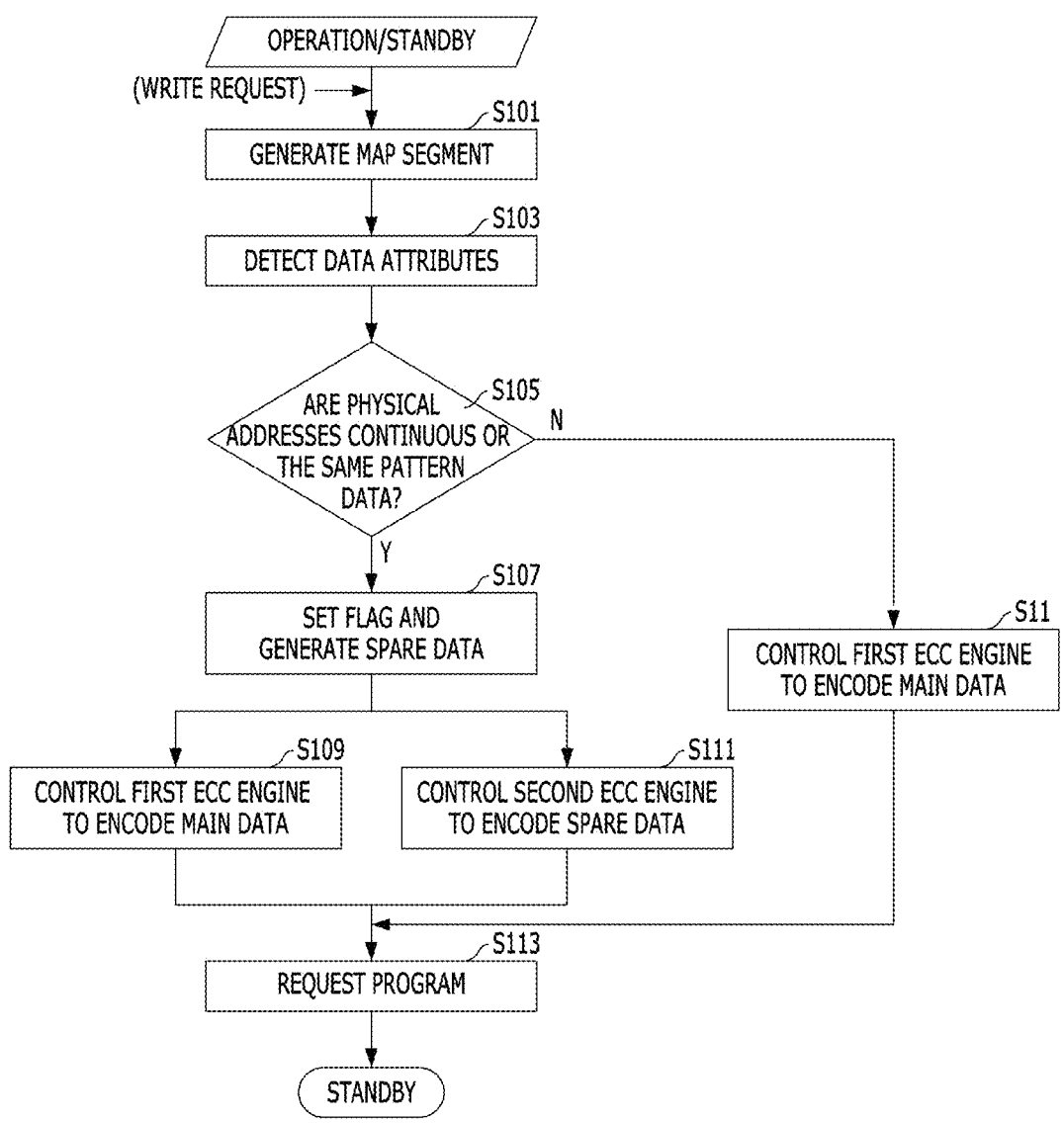
FIG. 5 is a flowchart for explaining an operation method of the data storage apparatus based on an embodiment of the disclosed technology.

FIG. 5 is a flowchart for explaining an operation for writing data based on an embodiment of the disclosed technology. The operation may be performed by a data storage apparatus 10 shown in FIG. 1.

While the data storage apparatus 10 is operating or waiting, a write request including host data to be written and a logical address may be transmitted from the host.

The controller 110 may configure a map segment based on the logical address included in the write request from the host (S101).

The controller 110 may detect attributes of the data requested to be written (S103).

The controller 110 may determine whether the attributes detected in step S103 satisfy predefined attributes (S105). In an embodiment, the predefined attributes may include at least one of the continuity of physical addresses of the data requested to be written or the regularity of the data requested to be written. For example, the regularity of the data depends on whether a specific logical value is repeated.

When the attributes of the data requested to be written satisfy the predefined attributes (S105: Y), the controller 110 may set a flag, store the flag in the index table, and generate spare data (S107).

In an embodiment, when the physical addresses of the data requested to be written are continuous, the controller 110 may set the first flag F1 for a map segment for the data requested to be written, add the first flag F1 to the index table, and generate the base physical address as the spare data. The based physical address is the head value of the physical address in the map segment, as the spare data.

In an embodiment, when the data requested to be written has a certain pattern regularity, the controller 110 may set the second flag F2 for the map segment for the data requested to be written, add the second flag F2 to the index table, and generate the repeated pattern and the number of repetitions as the spare data.

The controller 110 may control the first ECC engine 231 to encode main data including the map segment generated in step S101 and the host data (S109), and control the second ECC engine 233 to encode the spare data generated in step S107 (S111).

Then, the first and second ECC engines 231 and 233 may transmit the encoded main data and the encoded spare data to the storage 120, respectively, and control the data to be programmed (S113).

On the other hand, when the attributes of the data requested to be written do not satisfy the predefined attributes (S105: N), the controller 110 may control the first ECC engine 231 to encode the main data including the map segment generated in step S101 and the host data (S115), transmit the encoded main data to the storage 120, and control the data to be programmed (S113).

Figure 6:
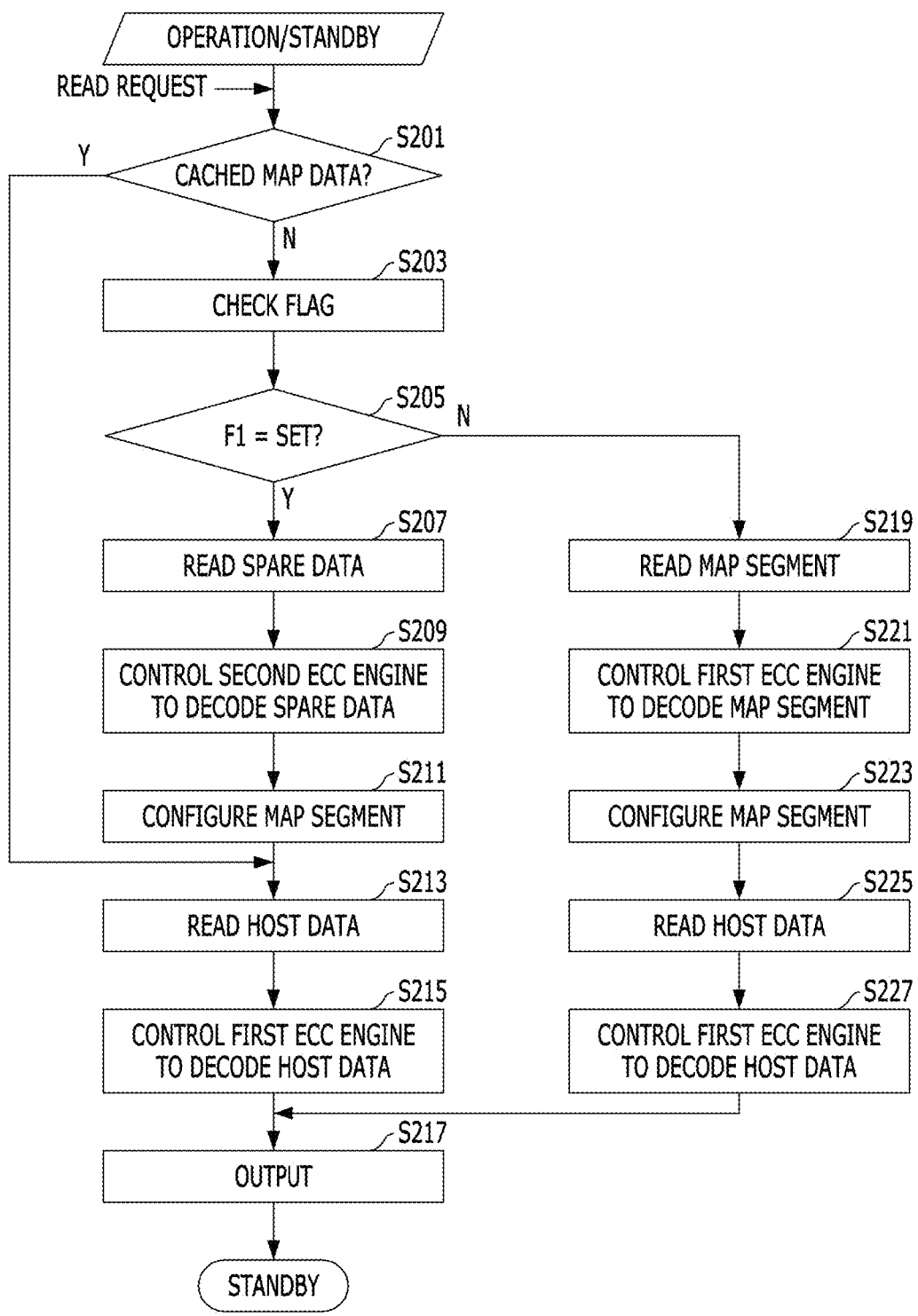
FIG. 6 is a flowchart for explaining the operation method of the data storage apparatus based on an embodiment of the disclosed technology.

FIG. 6 is a flowchart for explaining an operation for reading data based on an embodiment of the disclosed technology. The operation may be performed by a data storage apparatus 10 shown in FIG. 1 and illustrates an example that the operation proceeds depends on whether a first flag has been set.

While the data storage apparatus 10 is operating or waiting, a read request including a logical address of host data to be read may be transmitted from the host.

The controller 110 may check whether a map segment corresponding to the logical address included in the read request from the host has been cached in the working memory (S201).

When the map segment has not been cached (N in S201), the controller 110 may read a flag for a map segment of data requested to be read by referring to an index table (S203) that is already loaded in the controller 110.

When the first flag has been set (SET) (Y in S205), the controller 110 may read the spare data from the spare region R2, for example, the base physical address (S207), and control the second ECC engine 233 to decode the spare data (S209).

The controller 110 may configure a map segment of the data to be read based on the base physical address derived as a result of the decoding of the second ECC engine 233 (S211). In an embodiment, the controller 110 may sequentially increase the base physical address based on a set offset, and configure and load a map segment including a designated number of map data. In another embodiment, the controller 110 may not load all map data constituting the map segment, and may configure the map segment based on the base physical address and the size of data to be read.

The controller 110 may access the storage 120 based on the configured map segment and read the host data (S213). The host data read from the storage 120 may be decoded by the first ECC engine 231 (S215) and outputted (S217).

When the first flag has not been set (SET) (N in S205), the controller 110 may read a map segment from the main data region R1 based on the address of the map segment stored in the index table (S219), and control the first ECC engine 231 to decode the read map segment (S221). Accordingly, when the map segment is configured (S223), the controller 110 may access a region of the storage 120 indicated by the configured map segment and read the host data (S225). The read host data may be decoded by the first ECC engine 231 (S227) and outputted (S217).

When the map segment of the data to be read has been cached in the working memory (Y in S201), the controller 110 may read the host data from the storage 120 based on the cached map segment (S213), and control the first ECC engine 231 to encode the read host data (S215) and output the encoded host data (S217).

Figure 7:
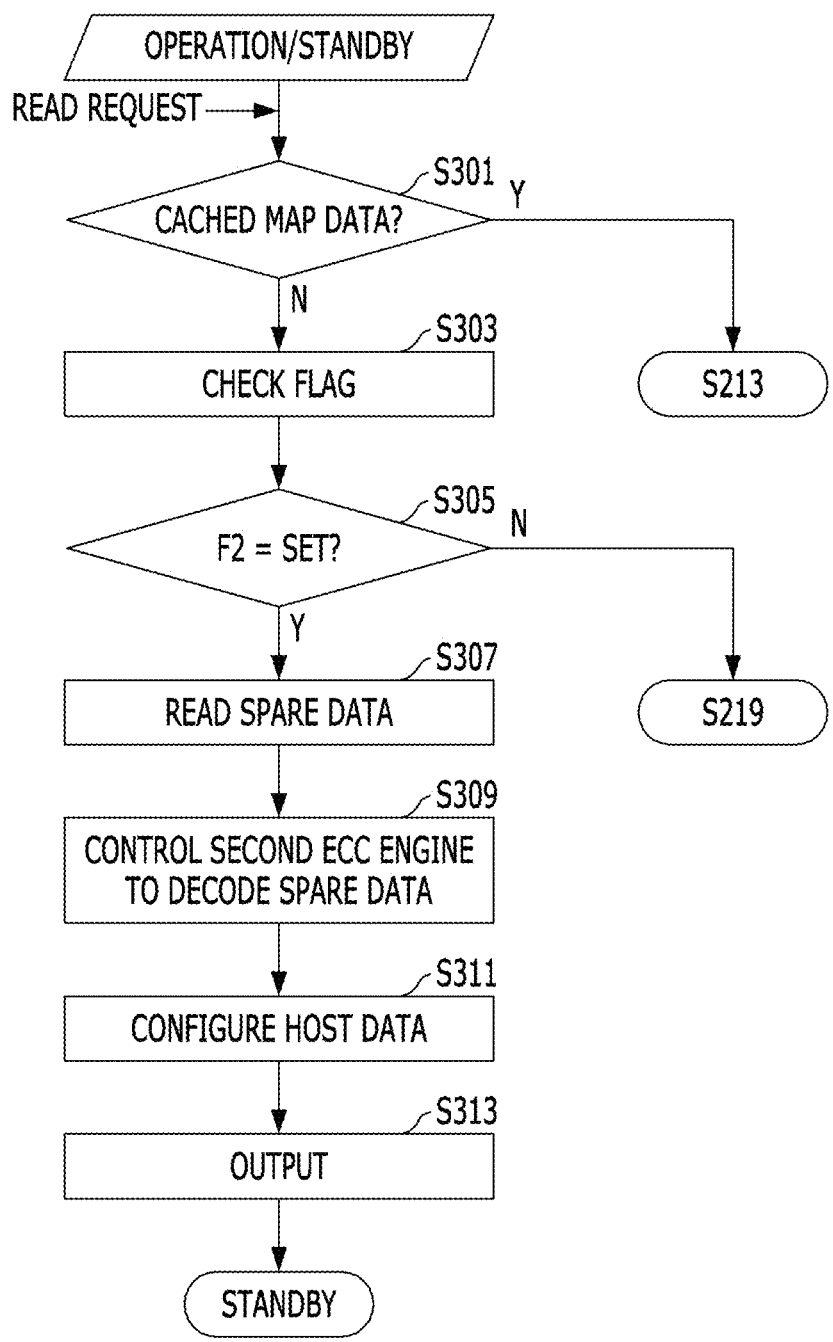
FIG. 7 is a flowchart for explaining the operation method of the data storage apparatus based on an embodiment of the disclosed technology.

FIG. 7 is a flowchart for explaining an operation for reading data based on an embodiment of the disclosed technology. The operation may be performed by a data storage apparatus 10 shown in FIG. 1 and illustrates an example that the operation proceeds depends on whether a second flag has been set.

While the data storage apparatus 10 is operating or waiting, a read request including a logical address of host data to be read may be transmitted from the host.

The controller 110 may read a flag for a map segment of the data requested to be read by referring to an index table (S301) that is already loaded in the controller 110.

When the second flag has been set (SET) (Y in S303), the controller 110 may read the spare data from the spare region R2, for example, the repeated pattern and the number of repetitions of the data (S305) and control the second ECC engine 233 to decode the spare data (S307).

The controller 110 may configure host data based on the decoded repeated pattern and number of repetitions (S309) and output the host data (S311).

When the second flag has not been set (SET) (N in S303), the controller 110 may check whether a map segment corresponding to the logical address included in the read request of the host has been cached in the working memory (S313).

When the map segment has been cached (Y in S313), the controller 110 may perform the operations after step S213 of FIG. 6. When the map segment of the data to be read has not been cached in the working memory (N in S313), the controller 110 may perform the operations after step S219 of FIG. 6.

In an embodiment, the controller 110 may perform the read operation by using both the first flag F1 indicating the continuity of physical addresses and the second flag F2 indicating the repeatability of data. In such a case, when the map segment of the data to be read has not been cached in the working memory (N in S313), the controller 110 may proceed to step S203 of FIG. 6 in order to perform the read operation based on whether the first flag has been set.

Figure 8:
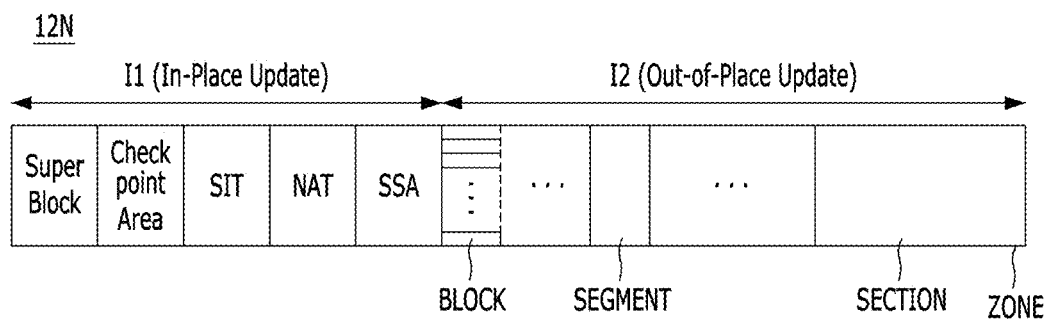
FIG. 8 is a configuration diagram of a storage based on an embodiment of the disclosed technology.

FIG. 8 is a configuration diagram of the storage 120 in accordance with an embodiment.

Referring to FIG. 8, the nonvolatile memory apparatuses (NVMs) 121 to 12N constituting the storage 120 may include a first region I1 and a second region 12.

The first region I1 is a region where various information managed by a file system of the data storage apparatus 10 are stored, and may include, for example, information on the number of currently allocated files, the number of valid pages, locations thereof, and the like. The second region 12 may be a space for storing various directory information, data, file information, and the like that are actually used by a user.

In an embodiment, the first region I1 may include a super block, a checkpoint area (CPA), a segment information table (SIT), a node address table (NAT), a segment summary area (SSA), and the like.

The second region 12 may be managed by a hierarchical structure of a zone ZONE, a section SECTION, a segment SEGMENT, and a block BLOCK.

The super block in the first region I1 may store default information of the file system.

The checkpoint area (CPA) stores a checkpoint. The checkpoint is data for storing a state of a computing system up to a logical breakpoint of the computing system when a system interruption event such as sudden power off occurs during the operation of the computing system, and data may be recovered using the checkpoint.

The segment information table (SIT) includes information on valid pages in each segment.

The node address table (NAT) may include an identifier for each node constituting an indexing tree of a file stored in the storage 120, and a physical address corresponding to each node identifier.

The segment summary area (SSA) is an area where summary information of each segment of the second region 12 is collected.

In an embodiment, the main data region R1 for storing the main data such as host data and a map segment may be allocated to the second region 12, and the spare region R2 for storing the spare data may be selectively allocated to the first region I1 or the second region 12.

The first region I1 may be operated in a random write method, and in the second region 12, data may be sequentially stored using a different position update method. Accordingly, in the second region 12, sequential write and random read workloads may frequently occur.

In such a structure, when the map segment configuration method as in the present technology is used, a large amount of map data required for reading sequentially written data can be read at a high speed, so that random read performance can also be improved.

Figure 9:
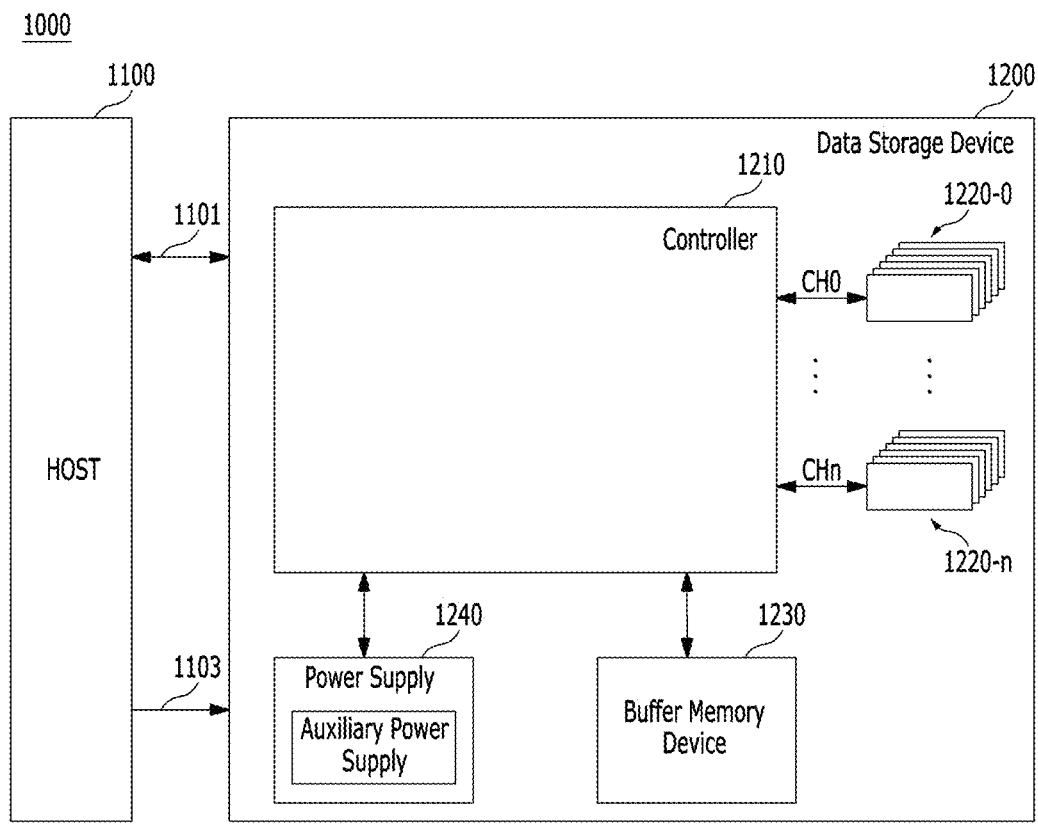
FIG. 9 is a diagram illustrating a data storage system based on an embodiment of the disclosed technology.

FIG. 9 is a diagram illustrating a data storage system 1000, in accordance with an embodiment.

Referring to FIG. 9, the data storage 1000 may include a host device 1100 and the data storage device 1200. In an embodiment, the data storage device 1200 may be configured as a solid state drive (SSD).

The data storage device 1200 may include a controller 1210, a plurality of nonvolatile memory devices 1220-0 to 1220-n, a buffer memory device 1230, a power supply 1240, a signal connector 1101, and a power connector 1103.

The controller 1210 may control general operations of the data storage device 1200. The controller 1210 may include a host interface unit, a control unit, a random access memory used as a working memory, an error correction code (ECC) unit, and a memory interface unit. In an embodiment, the controller 1210 may configured as controller 110 shown in FIGS. 1 and 2.

The host device 1100 may exchange a signal with the data storage device 1200 through the signal connector 1101. The signal may include a command, an address, data, and so forth.

The controller 1210 may analyze and process the signal received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to 1220-n. Further, the buffer memory device 1230 may temporarily store the data read from at least one of the nonvolatile memory devices 1220-0 to 1220-n. The data temporarily stored in the buffer memory device 1230 may be transmitted to the host device 1100 or at least one of the nonvolatile memory devices 1220-0 to 1220-n according to control of the controller 1210.

The nonvolatile memory devices 1220-0 to 1220-n may be used as storage medium of the data storage device 1200. The nonvolatile memory devices 1220-0 to 1220-n may be coupled with the controller 1210 through a plurality of channels CH0 to CHn, respectively. One or more nonvolatile memory devices may be coupled to one channel. The nonvolatile memory devices coupled to each channel may be coupled to the same signal bus and data bus.

The power supply 1240 may provide power inputted through the power connector 1103 to the controller 1210, the nonvolatile memory devices 1220-0 to 1220-n and the buffer memory device 1230 of the data storage device 1200. The power supply 1240 may include an auxiliary power supply. The auxiliary power supply may supply power to allow the data storage device 1200 to be normally terminated when a sudden power interruption occurs. The auxiliary power supply may include bulk-capacity capacitors sufficient to store the needed charge.

The signal connector 1101 may be configured as one or more of various types of connectors depending on an interface scheme between the host device 1100 and the data storage device 1200.

The power connector 1103 may be configured as one or more of various types of connectors depending on a power supply scheme of the host device 1100.

Figure 10:
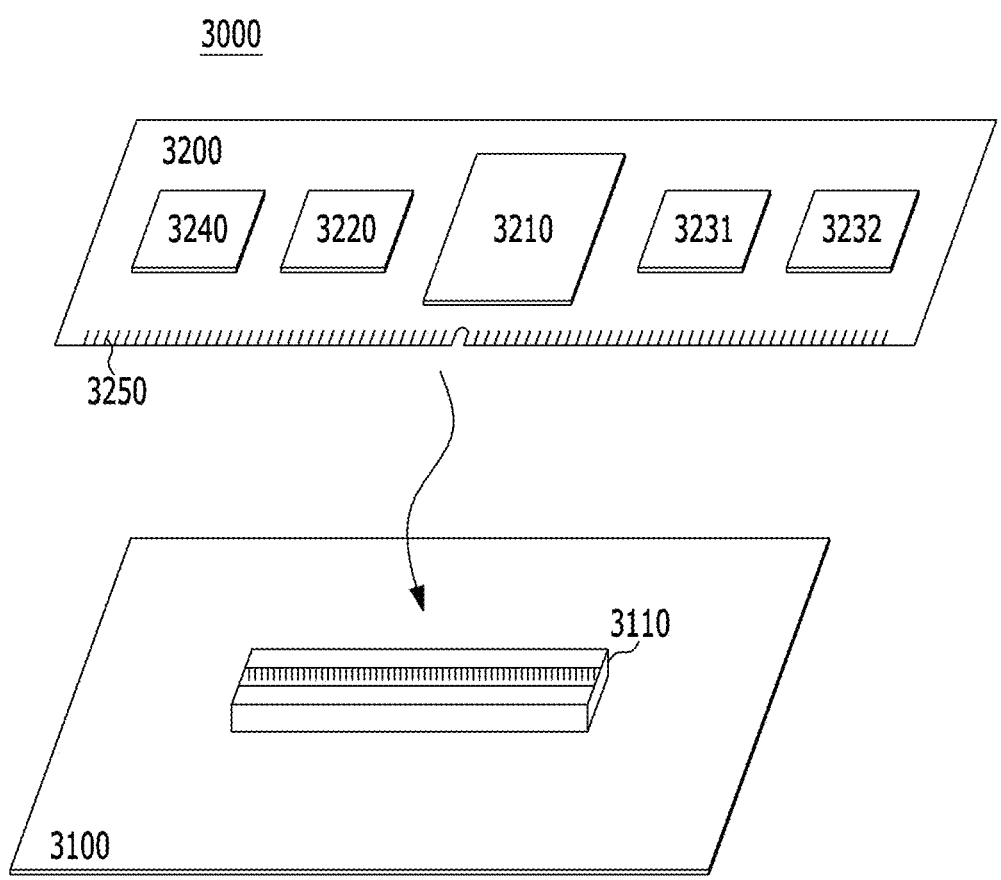
FIG. 10 and FIG. 11 are diagrams illustrating a data processing system based on an embodiment of the disclosed technology.

FIG. 10 is a diagram illustrating a data processing system 3000, in accordance with an embodiment. Referring to FIG. 10, the data processing system 3000 may include a host device 3100 and a memory system 3200.

The host device 3100 may be configured in the form of a board, such as a printed circuit board. Although not shown, the host device 3100 may include internal function blocks for performing the function of a host device.

The host device 3100 may include a connection terminal 3110, such as a socket, a slot, or a connector. The memory system 3200 may be mated to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 110 shown in FIGS. 1 and 2.

The buffer memory device 3220 may temporarily store data to be stored in the nonvolatile memory devices 3231 and 3232. Further, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250 to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data, and so forth, and power may be transferred between the host device 3100 and the memory system 3200. The connection terminal 3250 may be configured as one or more of various types depending on an interface scheme between the host device 3100 and the memory system 3200. The connection terminal 3250 may be disposed on a side of the memory system 3200, as shown.

Figure 11:
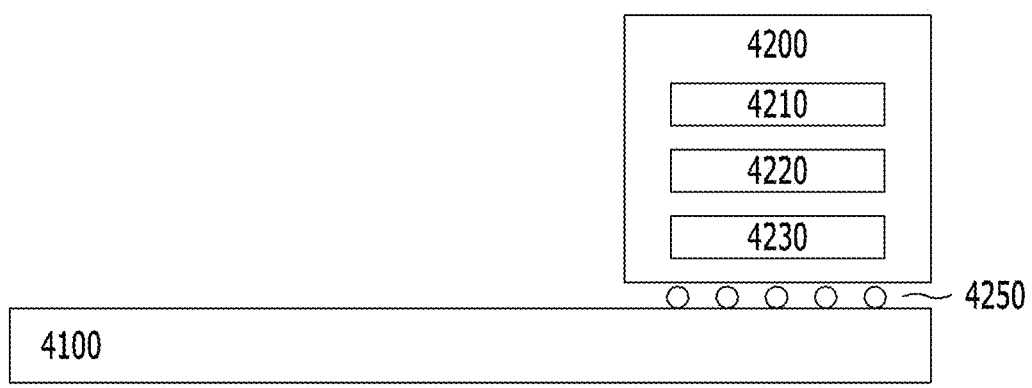

FIG. 11 is a diagram illustrating a data processing system 4000 in accordance with an embodiment. Referring to FIG. 11, the data processing system 4000 may include a host device 4100 and a memory system 4200.

The host device 4100 may be configured in the form of a board, such as a printed circuit board. Although not shown, the host device 4100 may include internal function blocks for performing the function of a host device.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 shown in FIGS. 1 and 2.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 12:
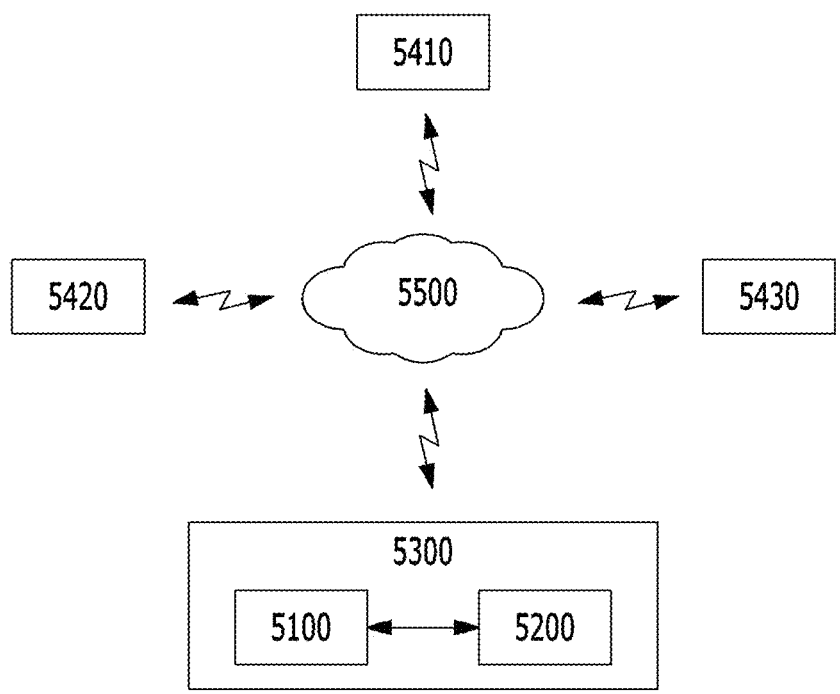
FIG. 12 is a diagram illustrating a network system including a data storage device based on an embodiment of the disclosed technology.

FIG. 12 is a diagram illustrating a network system 5000 including a data storage device, in accordance with an embodiment. Referring to FIG. 12, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device 5100 and a memory system 5200. The memory system 5200 may be configured as the memory system 10 shown in FIG. 1, the data storage device 1200 shown in FIG. 9, the memory system 3200 shown in FIG. 10, or the memory system 4200 shown in FIG. 11.

Figure 13:
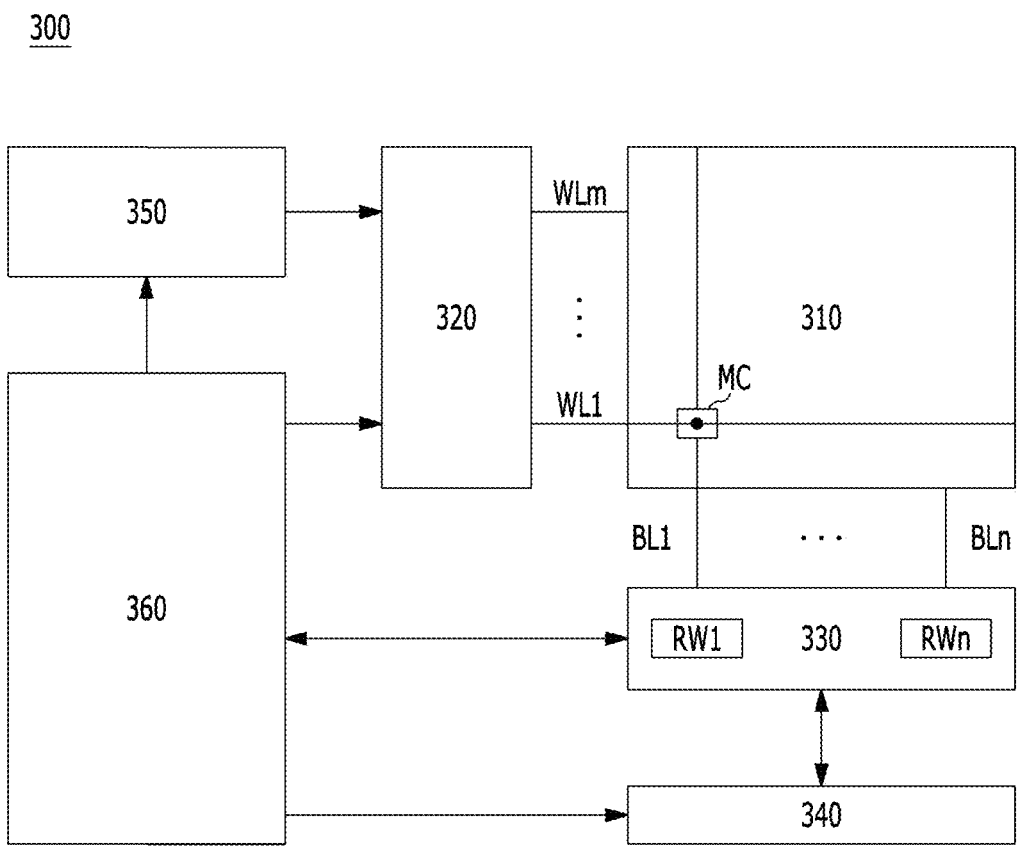
FIG. 13 is a block diagram illustrating a nonvolatile memory device included in a data storage device based on an embodiment of the disclosed technology.

FIG. 13 is a block diagram illustrating a nonvolatile memory device 300 included in a data storage device, such as the data storage device 10, in accordance with an embodiment. Referring to FIG. 13, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The memory cell array 310 may comprise a three-dimensional memory array. The three-dimensional memory array, for example, has a stacked structure by perpendicular direction to the flat surface of a semiconductor substrate. Moreover, the three-dimensional memory array means a structure including NAND strings which memory cells comprised in NAND strings are stacked perpendicular to the flat surface of a semiconductor substrate.

The structure of the three-dimensional memory array is not limited to the embodiment indicated above. The memory array structure can be formed in a highly integrated manner with horizontal directionality as well as vertical directionality. In an embodiment, in the NAND strings of the three-dimensional memory array memory cells are arranged in the horizontal and vertical directions with respect to the surface of the semiconductor substrate. The memory cells may be variously spaced to provide different degrees of integration The row decoder 320 may be coupled with the memory cell array 310 through the word lines WL1 to WLm. The row decoder 320 may operate according to control of the control logic 360. The row decoder 320 may decode an address provided by an external device (not shown). The row decoder 320 may select and drive the word lines WL1 to WLm, based on a decoding result. For instance, the row decoder 320 may provide a word line voltage, provided by the voltage generator 350, to the word lines WL1 to WLm.

The data read/write block 330 may be coupled with the memory cell array 310 through the bit lines BL1 to BLn. The data read/write block 330 may include read/write circuits RW1 to RWn, respectively, corresponding to the bit lines BL1 to BLn. The data read/write block 330 may operate according to control of the control logic 360. The data read/write block 330 may operate as a write driver or a sense amplifier, according to an operation mode. For example, the data read/write block 330 may operate as a write driver, which stores data provided by the external device in the memory cell array 310 in a write operation. For another example, the data read/write block 330 may operate as a sense amplifier, which reads out data from the memory cell array 310 in a read operation.

The column decoder 340 may operate according to control of the control logic 360. The column decoder 340 may decode an address provided by the external device. The column decoder 340 may couple the read/write circuits RW1 to RWn of the data read/write block 330, respectively corresponding to the bit lines BL1 to BLn, with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided by the external device. For example, the control logic 360 may control operations of the nonvolatile memory device 300 such as read, write, and erase operations of the nonvolatile memory device 300.

The above described embodiments are intended to illustrate and not to limit the present disclosure. Variations and enhancements to the disclosed embodiments and other embodiments may be made based on what is described and illustrated in this patent document.

What is claimed is:

1. A data storage apparatus comprising:
a storage including a main data region for storing first data and a spare region for storing second data indicating attributes of the first data; and
a controller in communication with a host and configured to control the storage based on a request from the host, wherein the controller comprises:
a first error check and correction (ECC) engine configured to perform an error correction on the first data stored in the main data region of the storage; and
a second ECC engine configured to perform an error correction on the second data stored in the spare region of the storage,
wherein the storage is divided to regions including a first region where management information of a file system is stored and a second region where data is written due to an operation requested by the host, and
the main data region is allocated to the second region and the spare region is allocated to either the first region or the second region.

2. The data storage apparatus according to claim 1, wherein the second ECC engine is configured to process the second data with a lower level of a complexity and a less amount of computations as compared to the first data processed by the first ECC engine.

3. The data storage apparatus according to claim 1, wherein the controller further comprises:
a map data manager configured to receive, from the host, a write request including write data to be written in the storage and logical addresses corresponding to locations in the storage to which the write data is written, and generate a map segment including mapping information between physical addresses and the logical addresses, and provide the first ECC engine with the first data including the write data or the map segment and provide the second ECC engine with the second data generated based on attributes of the write data or the map segment.

4. The data storage apparatus according to claim 3, wherein the controller is further configured to seta first flag for the map segment in an index table used to man age a store location of the map segment when the physical addresses of the write data are continuous, and generate the second data including a base physical address having a smallest value among the physical addresses in the map segment.

5. The data storage apparatus according to claim 4, wherein the controller is further configured to receive, from the host, a read request including a logical address corresponding to a location in the storage from which a read data is read, and configure a map segment based on the base physical address read from the spare region when a map segment corresponding to the logical address of the read data has not been cached and the first flag has been set in the index table.

6. The data storage apparatus according to claim 5, wherein the controller is further configured to output, to the host, the read data read from the main data region based on the configured map segment.

7. The data storage apparatus according to claim 3, wherein the controller is further configured to set a second flag for the map segment in an index table used to manage a storage location of the map segment when the write data has a specific pattern repeated, and generate the second data including the specific pattern and a number of repetitions of the specific pattern in the write data.

8. The data storage apparatus according to claim 7, wherein the controller is further configured to receive, from the host, a read request including a logical address corresponding to a location in the storage from which a read data is read, and wherein the controller is further configured to output, to the host, the read data based on the specific pattern and the number of repetitions read from the spare region when a map segment corresponding to the logical address of the read data has not been cached and the second flag has been set in the index table.

9. A data storage apparatus comprising:
a storage including a main data region and a spare region; and
a controller in communication with the storage and configured to control the storage,
wherein the controller is in communication with a host and comprises:
a map data manager configured to 1) receive, from the host, a write request including write data to be written in the storage and a logical address corresponding to a location in the storage to which the write data is written, 2) generate a map segment including mapping information between a physical address and the logical address, and 3) generate spare data based on attributes of the write data;
a first ECC engine configured to perform an error correction on main data including the write data or the map segment;
a second ECC engine configured to perform an error correction on the spare data; and
a processing circuit configured to write the main data to the main data region, and to write the spare data to the spare region.

10. The data storage apparatus according to claim 9, wherein the map data manager is further configured to set a first flag for the map segment in an index table used to manage a store location of the map segment when physical addresses of the write data are continuous, and generate the spare data including a base physical address having a smallest value among the physical addresses in the map segment.

11. The data storage apparatus according to claim 10, wherein the map data manager is further configured to receive, from the host, a read request including a logical address corresponding to a location in the storage from which a read data is read, and configure a map segment based on the base physical address read from the spare region when a map segment corresponding to the logical address of the read data has not been cached and the first flag has been set in the index table.

12. The data storage apparatus according to claim 9, wherein the map data manager is further configured to seta second flag for the map segment in an index table used to manage a storage location of the map segment when the write data has a specific pattern repeated, and generate the spare data including the specific pattern and a number of repetitions of the specific pattern in the write data.

13. The data storage apparatus according to claim 12, wherein the map data manager is configured to receive, from the host, a read request including a logical address corresponding to a location in the storage from which a read data is read, and wherein the controller is further configured to output, to the host, the read data based on the specific pattern and the number of repetitions read from the spare region when a map segment corresponding to the logical address has not been cached and the second flag has been set in the index table.

14. An operating method of a data storage apparatus, comprising:
dividing the data storage apparatus to regions including a first region where management information of a file system is stored and a second region where data is written due to an operation requested by a host;
receiving a request, from a host, to read or write data from a storage in the data storage apparatus; and
performing an operation to read or write data from the data storage apparatus including a main data region allocated among the second region for storing first data and a spare region allocated among either the first region or the second region for storing second data that is generated based on attributes of the first data,
wherein the performing of the operation includes writing or reading the first data using a first ECC engine and writing or reading the second data using a second ECC engine.

15. The operating method according to claim 14, wherein the second ECC engine is configured to process the second data with a lower level of a complexity and a smaller amount of computations as compared to the first data processed by the first ECC engine.

16. The operating method according to claim 14, wherein the request to write the data in the storage is received from the host together with logical addresses corresponding to locations in the storage to which the data is written and,
wherein the performing of the operation includes:
generating a map segment including mapping information between physical addresses and the logical addresses;
providing the first ECC engine with the first data including the data or the map segment; and
generating the second data and providing the second ECC engine with the second data when the data satisfies predefined attributes.

17. The operating method according to claim 16, further comprising:
setting a first flag for the map segment in an index table used to manage a storage location of the map segment when the physical addresses of the data requested to be written are continuous; and
generating the second data including a base physical address having a smallest value among the physical addresses in the map segment.

18. The operating method according to claim 17, wherein the request to read data from the storage is received from the host together with a logical address corresponding to a location in the storage from which the data is read, and wherein the performing of the operation includes:
configuring a map segment based on the base physical address read from the spare region when a map segment corresponding to the logical address has not been cached and the first flag has been set in the index table.

19. The operating method according to claim 18, further comprising:
reading the data from the main data region based on the configured map segment and outputs the data to the host.

20. The operating method according to claim 16, further comprising:
setting a second flag for the map segment in an index table used to manage a storage location of the map segment when the data requested to be written has a specific pattern repeated; and
generating the second data including the specific pattern and a number of repetitions into the second data.

21. The operating method according to claim 20, wherein the request to read data from the storage is received from the host together with a logical address corresponding to a location in the storage from which the data is read, and wherein the performing of the operation includes:
reading, from the spare region, the specific pattern and the number of repetitions to the data to configure the data when a map segment corresponding to the logical address has not been cached and the second flag has been set in the index table.

* * * * *